United States Patent [19]

Robinson et al.

[11] 3,760,011

[45] Sept. 18, 1973

[54] TRIOLS BY HYDROGENATION OF BICYCLIC FURODIOXOLES

[75] Inventors: Alfred G. Robinson; Alden E. Blood; Hugh J. Hagemeyer, Jr., all of Longview, Tex.

[73] Assignee: Eastman Kodak Company, Rochester, N.Y.

[22] Filed: Apr. 14, 1969

[21] Appl. No.: 816,073

Related U.S. Application Data

[63] Continuation-in-part of Ser. No. 798,803, Feb. 12, 1969, Pat. No. 3,564,017.

[52] U.S. Cl............ 260/635 E, 252/194, 252/364, 260/75 R, 260/92.8 R, 260/635 R
[51] Int. Cl...... C03c 31/18, C08f 3/30, C08g 17/00
[58] Field of Search ..................... 260/635 R, 635 E

[56] References Cited
UNITED STATES PATENTS

| | | | |
|---|---|---|---|
| 2,174,651 | 10/1939 | Byrkit | 260/635 C |
| 2,898,492 | 5/1959 | Fischer et al. | 260/635 E |
| 3,168,534 | 2/1965 | Payne | 260/635 E |
| 2,440,929 | 5/1948 | Bremner et al. | 260/635 E |

FOREIGN PATENTS OR APPLICATIONS

| | | | |
|---|---|---|---|
| 527,170 | 7/1956 | Canada | 260/635 E |

OTHER PUBLICATIONS

Broquet et al., "Chem. Abstracts", Vol. 67, (1967), page 7,724, item 82010Y.

*Primary Examiner*—Leon Zitver
*Assistant Examiner*—Joseph E. Evans
*Attorney*—Cecil D. Quillen, Jr. and John A. Gazewood

[57] ABSTRACT

Triols having a neopentyl structure are prepared by catalytic hydrogenation, preferably in the presence of water, of certain bicyclic furodioxole compounds at elevated temperatures and pressures. For example, 3,3-dimethyl-1,2,4-butanetriol is prepared by catalytic hydrogenation of tetrahydro-[2,3-d]-1,3-dioxol-5-ol at temperatures in the range from about 75°C. to about 175°C. and pressures of about 100 psi to about 10,000 psi. Triols are useful solvents and intermediates in the preparation of alkyd coating compositions and plasticizers for resinous materials such as polyvinyl chloride.

28 Claims, No Drawings

TRIOLS BY HYDROGENATION OF BICYCLIC FURODIOXOLES

RELATED APPLICATIONS

This application is a continuation-in-part of copending application Ser. No. 798,803 filed Feb. 12, 1969, now U.S. Pat. No. 3,564,017.

This invention relates to novel polyhydroxy compounds and to their preparation. More particularly, the invention is concerned with novel organic triols having the neopentyl structure and to methods for their preparation.

The novel triols of the present invention can be regarded generically as 3,3-dialkyl-1,2,4-butanetriols. The invention compounds have the formula

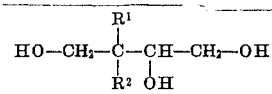

wherein $R^1$ and $R^2$ are the same or different and each of $R^1$ and $R^2$ are alkyl groups of one to 10 carbon atoms, preferably one to four carbon atoms. The invention compounds are useful solvents and humectants as well as intermediates in the preparation of alkyd resins and plasticizers for resinous materials such as polyvinyl chloride compositions.

The instant novel 3,3-dialkyl-1,2,4-butanetriols can be prepared according to the method of this invention by the catalytic hydrogenation of certain bicyclic furodioxoles. In general terms, the method of preparing the invention compounds comprises the catalytic hydrogenation, preferably in the presence of water, of certain bicyclic furodioxoles, hereinafter more fully described, at temperatures in the range of 75°C. to 175°C. at pressures ranging from about 100 to 10,000 psi. In a more preferred embodiment, the bicyclic furodioxole is preheated to the hydrogenation temperature under a hydrogen atmosphere at a pressure below the actual hydrogenation pressure. Following this preheat, the pressure is elevated to the desired level at which the reduction is effected. The product triol can be recovered by any suitable means from the crude hydrogenation effluent.

Bicyclic furodioxole compounds suitable for use in the preparation of the novel polyhydroxy compounds of this invention include tetrahydro-2-alkyl-6,6-dialkylfuro-[2,3-d]-1,3-dioxol-5-ols of the formula:

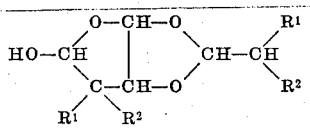

wherein $R^1$ and $R^2$ are as previously described. These compounds can be prepared by condensing glyoxal with an aldehyde having a single alpha hydrogen atom in the presence of certain aqueous bases at temperatures in the range of 10°C. to 50°C. Aldehydes suitable for use in the condensation include isobutyraldehyde, 2-ethylhexaldehyde, 2-methylpentaldehyde and 2-ethylbutyraldehyde. These aldehydes have the general formula:

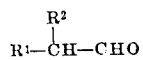

wherein $R^1$ and $R^2$ are the same or different and each of $R^1$ and $R^2$ are alkyl groups of one to 10 carbon atoms, preferably one to four carbon atoms. The aqueous bases which are most effective in the condensation include the alkali metal carbonates and acetates such as sodium carbonate, potassium carbonate and sodium acetate. A preferred bicyclic furodioxole is tetrahydro-2-isopropyl-6,6-dimethylfuro-[2,3-d]-1,3-dioxol-5-ol, which is formed from the condensation of isobutyraldehyde and glyoxal. Tetrahydro-2-isopropyl-6,6-dimethylfuro-[2,3-d]-1,3-dioxol-5-ol is hydrogenated according to the method of our invention to yield 3,3-dimethyl-1,2,4-butanetriol as a particularly preferred embodiment of our invention.

The catalytic hydrogenation of the bicyclic furodioxole to yield the 3,3-dialkyl-1,2,4-butanetriols of the invention can be illustrated by the following equation

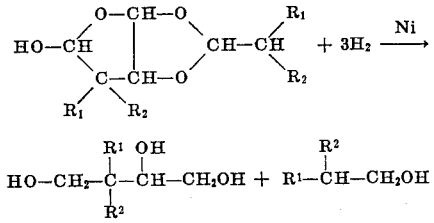

wherein $R^1$ and $R^2$ are as previously described.

It will be noted that the bicyclic furodioxole compound has three carbon-oxygen bonds which must be rather specifically broken in order to obtain the desired product:

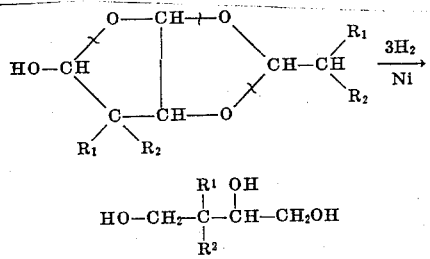

Generally, the hydrogenolysis of aliphatic carbon-oxygen ether bonds is a reaction ordinarily requiring elevated temperatures. For example, it has been reported that dialkyl ethers are stable to hydrogen at temperatures less than 250°C. over nickel, [Adkins, "Reaction of Hydrogen with Organic Compounds over Copper-Chromium Oxide and Nickel Catalysts", University of Wisconsin Press (1937) p. 73]. It has also been reported that the reduction of tetrahydrofurfuryl alcohol to 1,5-pentanediol was carried out at 255°C. over copper chromite, [Kaufman et al., *Organic Synthesis*, 26 83 (1946)].

However, the bicyclic furodioxole compounds are susceptible to thermal decomposition, forming hydroxyfuranones:

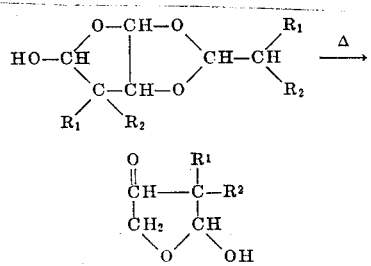

The hydroxyfuranones are more stable to hydrogenation and the formation of these compounds by thermal decomposition deleteriously affects the yield of desired triol.

The triol itself will undergo chain scission to further decrease the yield of desired product and further complicate separation and recovery of the product:

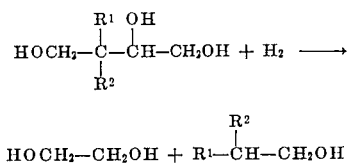

$$HOCH_2-\underset{\underset{R^2}{|}}{\overset{\overset{R^1}{|}}{C}}-\overset{\overset{OH}{|}}{CH}-CH_2OH + H_2 \longrightarrow$$

$$HOCH_2-CH_2OH + R^1-\overset{\overset{R^2}{|}}{CH}-CH_2OH$$

In order to obtain commercial yields of the triol, it would be necessary that hydrogenation of the source material be effected under conditions such that hydrogenolysis of the three carbon-oxygen ether bonds takes place with a minimum of thermal decomposition of bicyclic furodioxole to a hydroxyfuranone as well as a minimum of hydrogenolysis or chain scission of the product triol.

We have found that bicyclic furodioxoles can be converted to 3,3-dialkyl-1,2,4-butanetriols at high conversions and yields with little, if any, thermal decomposition of bicyclic furodioxole to hydroxyfuranone compounds and the substantial elimination of hydrogenolysis or chain scission of the triol. The desired conversion is accomplished by the catalytic hydrogenation, preferably in the presence of water, of the starting bicyclic furodioxole at moderate temperatures and superatmospheric pressures. Thus, according to the process of our invention, when bicyclic furodioxole compounds are catalytically hydrogenated at a temperature in the range of about 75°C. to about 175°C., preferably about 120°C. to about 150°C., 3,3-dialkyl-1,2,4-butanetriols can be produced in high conversions and yields with minimum undesirable side effects. The hydrogenation is effected at pressures ranging from about 100 psi to about 10,000 psi, preferably about 100 psi to about 6,000 psi, with excellent results being obtained at pressures in the range of 2,000–5,000 psi. It has also been found beneficial to preheat or soak the starting material in the presence of the catalyst for from about 30 minutes to about 4 hours under a hydrogen atmosphere at a pressure below the actual hydrogenation pressure, for example, from about 100 to about 1,500 psi. After the preheat period, the pressure is raised to the desired level, say on the order of 2,000 to 6,000 psi, at which reduction is effected. In a particularly preferred embodiment, the starting material is placed in contact with the catalyst under a hydrogen atmosphere at a pressure in the range of about 100 psi to about 1,500 psi, more particularly, 1,000 to 1,500 psi. The temperature is raised to the hydrogenation temperature, e.g., 75°C. to 175°C., and the pressure is then raised to the desired level, e.g., 2,000–6,000 psi, at which reduction is effected.

The catalysts useful in the process of our invention include the hydrogenation catalysts, e.g., metals of Groups V-B, VI-B, VII-B and VIII of the periodic system and compounds thereof. Conventional mixed hydrogenation catalysts such as copper-chromium oxide catalysts, may also be used. Representative catalysts include rhdoium, ruthenium, rhenium, osmium, iridium, palladium, platinum, copper-chromium oxide (copper chromite), iron, copper, nickel and cobalt. The metals may be used in the form of Raney catalysts. The catalysts can be used in finely divided or pelleted form as such or can be supported on an inert carrier such as silica, alumina, silica gel, pumice, kieseguhr, etc. Preferred catalysts include Raney nickel, cobalt, palladium on alumina, and copper chromite. The concentration of the catalyst is not critical and will generally be in the range of about 0.5 to about 20 weight percent, preferably 0.5 to 12 weight percent, based on furodioxole charge.

The presence of water is advantageous in achieving maximum catalytic efficiency. With water present, catalyst concentrations as low as 0.5 to 2.0 weight percent, based on furodioxole charged, can be used to obtain the product triol in high conversions and yields. The concentration of water is not critical and can be varied from 20 to 100 percent of the furodioxole charged. Higher concentrations of water may be used although there appears to be no advantage in doing so. If desired, the use of water can be completely eliminated by using a sufficiently high catalyst concentration, e.g., 10 percent, based on the furodioxole charged.

The following examples are set forth for purposes of illustrating the invention.

EXAMPLE 1

Preparation of the bicyclic furodioxole, Tetrahydro-2-isopropyl-6,6-dimethylfuro-[2,3-d]-1,3-dioxol-5-ol.

A solution of 450 g. of potassium carbonate dissolved in 450 g. of water is added incrementally to a stirred mixture consisting of 6,000 ml. of water, 1800 g. of isobutyraldehyde and 1,800 g. of glyoxal. The time required for addition is 2 hours. During the addition, the reaction temperature increases from 24°C. to 42°C. After addition is complete, the mixture is stirred for 4 additional hours. An organic layer is separated from to reaction mixture. The crude product is washed once with an equal volume of water and then is heated to 50°C. at reduced pressures to remove water and unreacted aldehydes. The resulting base product solidifies to give a white waxy solid. Tetrahydro-2-isopropyl-6,6-dimethylfuro-[2,3-d]-1,3-dioxol-5-ol (2,020 g.) is obtained.

EXAMPLE 2

Preparation of 3,3-Dimethyl-1,2,4-Butanetriol

A mixture consisting of 1,000 g. (4.95 moles) of tetrahydro-2-isopropyl-6,6-dimethylfuro-[2,3-d]-1,3-dioxol-5-ol, 1,000 g. of water and 6.25 g. of Raney nickel catalyst is charged to a 4 l. stirred autoclave. After purging with hydrogen, the mixture is heated to 100°C. under a hydrogen pressure of 1,000 psi. The hydrogen pressure is then raised to 3,000 psi and the reduction is carried out at 3,000 psi and 100°C. for 4 hours. After cooling, the catalyst is removed by filtration. The filtrate is distilled at reduced pressure to remove water and isobutanol. The residue is flash distilled at 2 mm. to give 650 g. (98 percent conversion) of 3,3-dimethyl-1,2,4-butanetriol, b.p., 121–130°C. at 2 mm.

EXAMPLE 3

Preparation of 3,3-Dimethyl-1,2,4-Butanetriol.

One mole (202 g.) of tetrahydro-2-isopropyl-6,6-dimethylfuro-[2,3-d]-1,3-dioxol-5-ol and 20 grams of Raney nickel are charged to a stirred autoclave. The mixture is heated with stirring to 135°C. under a hydrogen atmosphere at 1,000 psi. The pressure is then raised to 3,000 psi H₂ and the mixture is reduced for 4 hours at 135°C. and 3,000 psi H₂. After cooling, the reaction mixture is filtered to remove catalyst. The filtrate is distilled and 69 grams of isobutanol and 128 grams of 3,3-dimethyl-1,2,4-butanetriol are recovered. The conversion is 96 percent. The structure assignment is based on the following analyses:

| Analysis | Theory | Found |
|---|---|---|
| Molecular Weight | 134 | 134 |
| Elemental Analysis | | |
| Percent Carbon | 53.73 | 53.89 |
| Percent Hydrogen | 10.44 | 10.26 |
| Percent Hydroxyl | 38.0 | 36.5 |
| NMR Analysis | Consistent with proposed structure | |
| Infrared Analysis | Consistent with proposed structure | |

EXAMPLE 4

A series of runs is made to compare the effects of reaction temperature, time, water concentration and catalyst concentration on product conversions:

| Run | Water concentration, percent * | Catalyst concentration, percent * | Temp., °C. | Pressure, p.s.i. | Time, hrs. | Percent conversion to 3,3-dimethyl-1,2,4-butanetriol |
|---|---|---|---|---|---|---|
| 1 | 0 | 10 | 100 | 3,000 | 4 | 71 |
| 2 | 0 | 10 | 125 | 3,000 | 4 | 88 |
| 3 | 0 | 10 | 175 | 3,000 | 4 | 40 |
| 4 | 0 | 10 | 75 | 3,000 | 4 | 54 |
| 5 | 0 | 10 | 125 | 3,000 | 2 | 57 |
| 6 | 0 | 10 | 150 | 3,000 | 4 | 83 |
| 7 | 0 | 10 | 150 | 3,000 | 2 | 85 |
| 8 | 100 | 1 | 100 | 3,000 | 4 | 99 |
| 9 | 33 | 1 | 100 | 3,000 | 4 | 98 |
| 10 | 11 | 1 | 100 | 3,000 | 4 | 78 |
| 11 | 100 | 20 | 100 | 3,000 | 4 | 94 |
| 12 | 100 | 0.6 | 100 | 3,000 | 4 | 99 |

* Based on weight of furodioxole charged.

Although the invention has been described in detail with particular reference to preferred embodiments thereof, it will be understood that variations and modifications can be effected within the spirit of the invention.

We claim:

1. A process for the preparation of a compound having the formula

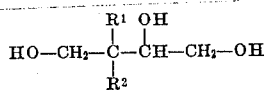

wherein $R^1$ and $R^2$ are the same or different and each of $R^1$ and $R^2$ is an alkyl group having from one to 10 carbon atoms, which comprises contacting a bicyclic furodioxole having the formula

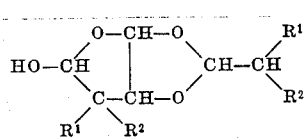

Wherein $R^1$ and $R^2$ are as previously defined, with hydrogen in the presence of from about 0.5 to about 20 weight percent based on furodioxole charged, of a hydrogenation catalyst at a temperature in the range of about 75° C. to about 175° C. and at a pressure in the range of about 100 psi to about 10,000 psi.

2. A process in accordance with claim 2 wherein each of $R^1$ and $R^2$ is an alkyl group having from one to four carbon atoms.

3. A process according to claim 1 wherein said hydrogenation catalyst is selected from the class consisting of palladium, platinum, ruthenium, rhenium, rhodium, nickel, cobalt, iron, copper-chromite or mixtures thereof.

4. A process according to claim 1 wherein said hydrogenation is effected at a temperature in the range of about 120°C. to about 150°C. and a pressure in the range of about 100 psi to about 6,000 psi.

5. A process according to claim 4 wherein said hydrogenation is effected at a pressure in the range of about 2,000 to about 6,000 psi.

6. A process according to claim 4 wherein said hydrogenation catalyst is Raney nickel.

7. A process according to claim 1 wherein said bicyclic furodioxole is contacted with hydrogen in the presence of said hydrogenation catalyst and at least 20 weight percent, based on furodioxole charged, of water.

8. A process according to claim 7 wherein said hydrogenation catalyst is selected from the group consisting of palladium, platinum, ruthenium, rhenium, rhodium, nickel, cobalt, iron, copper chromite or mixtures thereof.

9. A process according to claim 8 wherein said hydrogenation is effected at a temperature in the range of about 120°C. to about 150°C. and a pressure in the range of about 100 psi to about 6,000 psi.

10. A process according to claim 9 wherein said hydrogenation is effected at a pressure in the range of about 2,000 to about 6,000 psi.

11. A process according to claim 10 wherein said hydrogenation catalyst is Raney nickel.

12. A process according to claim 1 wherein said bicyclic furodioxole and said hydrogenation catalyst are preheated prior to hydrogenation at a temperature in the range of about 75°C. to about 175°C. under a hydrogen pressure in the range of 100 to 1,500 psi and are subsequently hydrogenated at a pressure in the range of 2,000 to 10,000 psi.

13. A process according to claim 12 wherein said catalyst is selected from the class consisting of palladium, platinum, ruthenium, rhenium, rhodium, nickel, cobalt, iron, copper chromite or mixtures thereof.

14. A process according to claim 13 wherein said preheating is effected under a hydrogen pressure in the range of 1,000 to 1,500 psi.

15. A process according to claim 14 wherein said hydrogenation is effected at a pressure in the range of 2,000 to 6,000 psi.

16. A process according to claim 15 wherein said preheating is at a temperature in the range of 120°C. to 150°C. and said hydrogenation is effected at a temperature in the range of 120°C. to 150°C.

17. A process according to claim 16 wherein said hydrogenation catalyst is Raney nickel.

18. A process according to claim 1 wherein said bicyclic furodioxole, said hydrogenation catalyst and at least 20 weight percent, based on furodioxole charged, of water are preheated prior to hydrogenation at a temperature in the range of about 75°C. to about 175°C. under a hydrogen pressure in the range of about 100 to about 1,500 psi and subsequently hydrogenated at a pressure in the range of 2,000 to 10,000 psi.

19. A process according to claim 18 wherein said catalyst is selected from the class consisting of palladium, platinum, ruthenium, rhenium, rhodium, nickel, cobalt, iron, copper chromite or mixtures thereof.

20. A process according to claim 19 wherein said preheating is effected under a hydrogen pressure in the range of 1,000 to 1,500 psi.

21. A process according to claim 20 wherein said hydrogenation is effected at a pressure in the range of 2,000 to 6,000 psi.

22. A process according to claim 21 wherein said preheating is at a temperature in the range of 120°C. to 150°C. and said hydrogenation is effected at a temperature in the range of 120°C. to 150°C.

23. A process according to claim 22 wherein said hydrogenation catalyst is Raney nickel.

24. A process according to claim 3 for preparing 3,3-dimethyl-1,2,4-butanetriol wherein said bicyclic furodioxole is tetrahydro-2-isopropyl-6,6-dimethylfuro-[2,3-d]-1,3-dioxol-5-ol.

25. A process according to claim 8 for preparing 3,3-dimethyl-1,2,4-butanetriol wherein said bicyclic furodioxole is tetrahydro-2-isopropyl-6,6-dimethylfuro-[2,3-d]-1,3-dioxol-5-ol.

26. A process according to claim 13 for preparing 3,3-dimethyl-1,2,4-butanetriol wherein said bicyclic furodioxole is tetrahydro-2-isopropyl-6,6-dimethylfuro-[2,3-d]-1,3-dioxol-5-ol.

27. A process according to claim 19 for preparing 3,3-dimethyl-1,2,4-butanetriol wherein said bicyclic furodioxole is tetrahydro-2-isopropyl-6,6-dimethylfuro-[2,3-d]-1,3-dioxol-5-ol.

28. A process according to claim 23 for preparing 3,3-dimethyl-1,2,4-butanetriol wherein said bicyclic furodioxole is tetrahydro-2-isopropyl-6,6-dimethylfuro-[2,3-d]-1,3-dioxol-5-ol.

* * * * *